US010971974B2

(12) United States Patent
Rachor

(10) Patent No.: US 10,971,974 B2
(45) Date of Patent: Apr. 6, 2021

(54) ELECTRIC CHARGING DEVICE WITH FLUID COOLING

(71) Applicant: BorgWarner Inc., Auburn Hills, MI (US)

(72) Inventor: Christoph Rachor, Mainhausen (DE)

(73) Assignee: BorgWarner Inc., Auburn Hills, MI (US)

( * ) Notice: Subject to any disclaimer, the term of this patent is extended or adjusted under 35 U.S.C. 154(b) by 267 days.

(21) Appl. No.: 16/099,110

(22) PCT Filed: Apr. 26, 2017

(86) PCT No.: PCT/US2017/029634
§ 371 (c)(1),
(2) Date: Nov. 5, 2018

(87) PCT Pub. No.: WO2017/192336
PCT Pub. Date: Nov. 9, 2017

(65) Prior Publication Data
US 2019/0157945 A1 May 23, 2019

(30) Foreign Application Priority Data
May 4, 2016 (DE) ...................... 10 2016 207 764.3

(51) Int. Cl.
*F04D 25/06* (2006.01)
*H02K 9/197* (2006.01)
(Continued)

(52) U.S. Cl.
CPC ............ *H02K 9/197* (2013.01); *F02B 39/005* (2013.01); *F02B 39/10* (2013.01); *F04D 17/10* (2013.01);
(Continued)

(58) Field of Classification Search
CPC .......... H02K 5/128; H02K 5/20; H02K 9/197; F02B 39/005; F02B 39/10; F04D 17/10; F04D 25/06; F04D 29/5806
See application file for complete search history.

(56) References Cited

U.S. PATENT DOCUMENTS 5,785,013 A * 7/1998 Sinn ..................... F04D 29/5813
                                                                                                                      123/41.44
6,199,528 B1 * 3/2001 Hotta ........................ F01P 5/10
                                                                                                                      123/142.5 E
(Continued)

FOREIGN PATENT DOCUMENTS

DE        19938624 A1    3/2001
EP         2053213 A1    4/2009

OTHER PUBLICATIONS

Written Opinion and International Search Report dated Jul. 6, 2017, in International Application No. PCT/US2017/029634.

*Primary Examiner* — Ramon M Barrera
(74) *Attorney, Agent, or Firm* — Eric L. Doyle; Stephan A. Pendorf Patent Central LLC

(57) ABSTRACT

A charging device for an internal combustion engine with a shaft, a compressor wheel arranged on the shaft, a stator housing and a stator. The stator is arranged within the stator housing. A rotor is arranged on the shaft and a cooling channel for accommodating a coolant extends axially between the stator housing and the stator. A split tube is provided between the rotor and stator. A first seal is provided in the axial direction between the stator housing and a first end of the stator and a second seal is provided in the axial direction between the stator housing and a first end of the split tube. Alternatively to the split tube, a separation tube is arranged between the stator and the stator housing so that the cooling channel is formed in the radial direction between the separation tube and the stator housing.

8 Claims, 2 Drawing Sheets

(51) Int. Cl.
   *F02B 39/00* (2006.01)
   *F02B 39/10* (2006.01)
   *F04D 17/10* (2006.01)
   *F04D 29/58* (2006.01)
   *H02K 5/20* (2006.01)
   *H02K 5/128* (2006.01)

(52) U.S. Cl.
   CPC ......... *F04D 25/06* (2013.01); *F04D 29/5806* (2013.01); *H02K 5/128* (2013.01); *H02K 5/20* (2013.01)

(56) References Cited

U.S. PATENT DOCUMENTS

| | | | |
|---|---|---|---|
| 7,182,585 B2 | 2/2007 | Bauknecht et al. | |
| 8,562,314 B2* | 10/2013 | Hong | F04D 29/20 417/423.7 |
| 8,920,142 B2* | 12/2014 | Gillingwater | H02K 5/128 417/423.14 |
| 8,979,504 B2* | 3/2015 | Snider | F04D 13/0633 417/53 |

\* cited by examiner

ELECTRIC CHARGING DEVICE WITH FLUID COOLING

FIELD OF THE INVENTION

The present invention relates to an electric charging device for an internal combustion engine with FLUID cooling.

BACKGROUND INFORMATION

Increasingly more vehicles of the more recent generation are equipped with charging devices. In order to achieve the target demands and the legal requirements, it is imperative to promote development in the complete drive train and also to optimize the individual components as well as the system as a whole with respect to their reliability and efficiency.

For example, exhaust gas turbochargers are known in which a turbine wheel is driven by the exhaust gas flow of the internal combustion engine. A compressor wheel, which is arranged with a turbine wheel on a mutual shaft, compresses the fresh air taken in for the engine. By this means, the air or oxygen amount, available to the engine for combustion, is increased, which in turn leads to an increased output of the internal combustion engine. The disadvantage in exhaust gas turbochargers is that their rotation rate or performance is dependent on the exhaust gas flow, thus on the engine loads. At low engine speeds, in particular, this may negatively affect the effectiveness and efficiency of exhaust gas turbochargers.

An alternative to exhaust gas turbochargers is presented by electric turbochargers, also called eBoosters. In these turbochargers, the shaft, on which the compressor wheel is arranged, is not driven by the exhaust gas flow from the engine or via a turbine wheel, but instead by an electric motor driving the shaft. For this purpose, a rotor is arranged on the shaft with a stator around the rotor. Shaft, rotor, and stator are surrounded by a stator housing. At high loads and during output peaks, these components heat up strongly. To prevent temperatures in the turbocharger that are too high, it is known to provide cooling channels, through which a coolant is supplied, for cooling the stator in the stator housing. However, these types of charging devices have a large design for the stator housing and a low efficiency for cooling the stator.

The same applies for electric or electrically supported charging devices as hybrid versions made from an exhaust gas turbocharger and an electric turbocharger, in which the drive of the compressor wheel is possible both by the exhaust flow via a turbine wheel and also via an electric motor arranged on the shaft, often between the turbine wheel and the compressor wheel.

The goal of the present invention is consequently to provide a charging device for an internal combustion engine with a compact design for the stator housing and simultaneously efficient cooling of the stator.

BRIEF SUMMARY OF THE INVENTION

The present invention relates to a charging device for an internal combustion engine according to Claim 1 and according to Claim 7.

The charging device according to the invention has a shaft, a compressor wheel arranged on the shaft, a stator housing, and a stator, wherein the stator is arranged within the stator housing. The charging device additionally comprises a rotor arranged on the shaft and a cooling channel for accommodating a coolant extending axially between the stator housing and the stator. A split tube is provided between the rotor and stator, wherein a first seal is provided in the axial direction between the stator housing and a first end of the stator and a second seal is provided in the axial direction between the stator housing and a first end of the split tube. The charging device according to the invention has the advantage that the stator is directly flushed by cooling fluid and thus an efficient cooling of the stator is facilitated. In addition, the stator housing can be produced in a die casting method, as no cooling channels need to be provided in the stator housing. This means that a smaller design of the stator housing may be realized, and a reduction of the material costs as well as a simpler and more cost-efficient production of the charging device. At the same time, the charging device according to the invention facilitates a good cooling of the rotor due to the split tube.

In configurations, a third seal may be provided in the axial direction between the stator housing and a second end of the split tube so that a dry compartment is created between the first seal and the third seal. The dry compartment is used for the dry accommodation of an electrical connection of the stator to a control unit that may be provided, for example, between a housing wall and a housing cover or between a housing wall and a compressor housing back wall.

In configurations, which are combinable with all previously described configurations, a second end of the stator, lying opposite the first end of the stator, may be the distal end of the stator, when viewed from the compressor wheel, and the cooling channel may extend radially inward in the direction of the shaft between the stator and the stator housing in the area of the second end of the stator. The area of the cooling channel extending radially inward may thereby extend up to a bearing seat of a bearing of the shaft, by which means the bearing seat is cooled. The bearing is also indirectly cooled in this way.

In configurations, which are combinable with all previously described configurations, the stator may comprise windings and sealing compound. The first seal may be integrated directly into the sealing compound or be formed from the sealing compound. Walls of the cooling channel may be formed directly by the stator housing and the sealing compound of the stator. This may be facilitated by the use of a fluid-tight, in particular a water-tight sealing compound. Alternatively or additionally, a fluid-tight membrane may be provided which surrounds the stator. The walls of the cooling channel are then formed by the membrane and the stator housing.

In configurations, which are combinable with all previously described configurations, the stator housing may comprise a main body and a cover. The second seal may, for example, be arranged between the split tube and the cover, in particular a projection of the cover which defines a bearing seat for a bearing for mounting the shaft.

The invention comprises in a second embodiment a charging device for an internal combustion engine with a shaft, a compressor wheel arranged on the shaft, a stator housing, and a stator, wherein the stator is arranged within the stator housing. In addition, the charging device comprises a rotor arranged on the shaft and a cooling channel extending axially for accommodating a coolant. A separation tube is arranged between the stator and the stator housing so that the cooling channel is formed in the radial direction between the separation tube and the stator housing. It is advantageous in this charging device that an efficient cooling of the stator is facilitated, as the coolant is only separated from the stator by a thin separation tube. In addition, the stator housing may be produced in a die casting method in this embodiment, as no cooling channels need to be provided in the stator housing. The separation tube itself may be manufactured in a simple way, for example, by deep drawing. In sum, this means in turn a smaller design of the stator housing and a reduction of the material costs as well as a simpler and more cost-efficient production of the charging device at a simultaneously more efficient stator cooling.

In configurations, a first seal may be provided between the stator housing and a first end of the separation tube and a second seal may be provided between the stator housing and a second end of the separation tube. The first seal may be arranged in the area of the proximal end of the stator, viewed from the compressor wheel, and in the area of the radially outer circumference of the stator so that a dry compartment is created radially within the seal in the area of the proximal end of the stator.

In configurations, which are combinable with all previously described configurations of the second embodiment, the longitudinal section of the separation tube may have an L-shape. A radially arranged leg of the separation tube may extend radially outward and the second seal may be arranged between the radially extending leg and the stator housing. Alternatively, the radially extending leg of the separation tube may extend radially inward. The second seal may then be arranged between the radial end of the radially extending leg and the stator housing such that the cooling channel may extend radially inward between the separation tube and the stator housing in the direction of the shaft. In particular, the seal may be arranged between the leg and a projection of the stator housing which defines a bearing seat for a bearing for mounting the shaft. The stator housing may comprise a main body and a cover. The projection may be a part of the cover and the second seal may be arranged between the separation tube and the cover.

In configurations, which are combinable with all previously described configurations of the second embodiment, the stator may comprise windings and sealing compound. The windings of the stator may be arranged in the separation tube during production and may be cast therein so that a fixed connection is created between the stator and the separation tube after the die casting.

In configurations, which are combinable with all previously described configurations of the second embodiment, the separation tube may be a deep drawn part.

In a third embodiment, the invention comprises a charging device for an internal combustion engine with a shaft, a compressor wheel arranged on the shaft, a stator housing, and a stator, wherein the stator is arranged within the stator housing. The stator has windings and sealing compound. In addition, the charging device comprises a rotor arranged on the shaft and a cooling channel extending axially for accommodating a coolant between the stator housing and the stator. A first seal is provided in the axial direction between the stator housing and a first end of the stator and a second seal is provided in the axial direction between the stator housing and a second end of the stator. Walls of the cooling channel are formed directly by the stator housing and the sealing compound of the stator. This may be facilitated, for example, by the use of a fluid-tight, in particular a water-tight sealing compound. Alternatively, a fluid-tight, in particular a water-tight membrane surrounds the stator. The walls of the cooling channel are then formed by the membrane and the stator housing. Advantageously in this embodiment of the charging device as well, the stator is directly flushed by cooling fluid and thus an efficient cooling of the stator is facilitated. Likewise, the stator housing may be produced in a die casting method, as no cooling channels need to be provided in the stator housing. This means that a smaller design of the stator housing may be realized, and a reduction of the material costs as well as a simpler and more cost-efficient production of the charging device.

In configurations, the first seal and/or the second seal may be integrated directly into the sealing compound or be formed from the sealing compound.

In configurations, which are combinable with all previously described configurations of the third embodiment, the second end of the stator, which may be the distal end of the stator when viewed from the compressor wheel, and the second seal may be arranged in the area of the radially inner circumference of the second end of the stator such that the cooling channel extends radially inward between the stator and stator housing in the direction of the shaft. The area of the cooling channel extending radially inward may thereby extend up to a bearing seat of a bearing of the shaft, by which means the bearing seat is cooled. The bearing is also indirectly cooled in this way.

In configurations, which are combinable with all previously described configurations of the third embodiment, the first seal may be arranged in the area of the radially outer circumference of the stator such that a dry compartment is created radially within the seal in the area of the first end of the stator. The stator housing may comprise a main body and a cover. The second seal may be arranged between the stator and the cover, in particular a projection of the cover which defines a bearing seat for a bearing for mounting the shaft.

DETAILED DESCRIPTION OF THE INVENTION

Figure 1:
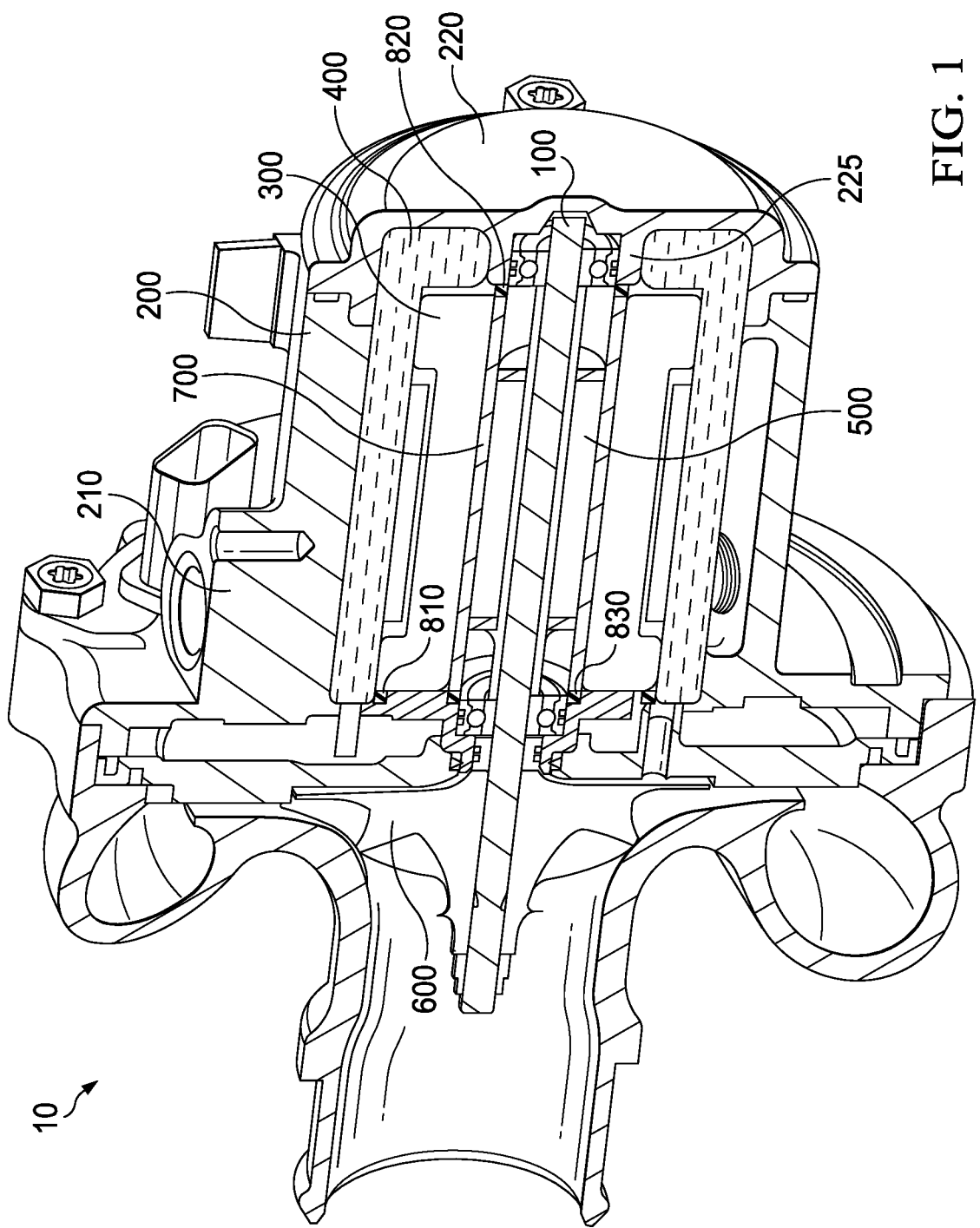
FIG. 1 shows a cutaway view of a first embodiment of the charging device according to the invention.

In the following, embodiments for the charging device according to the invention for an internal combustion engine are described by way of the figures. Identical components are referenced in the figures with identical reference numerals.

FIG. 1 shows a charging device 10 with a shaft 100, a compressor wheel 600 arranged on shaft 100, a stator housing 200, and a stator 300. Stator 300 is arranged within stator housing 200. Charging device 10 further comprises a rotor 500 arranged on shaft 100 and an axially extending cooling channel 400 for accommodating a coolant. Cooling channel 400 is provided between stator housing 200 and stator 300 are runs in a ring shape or in a cylindrical shape along the circumference of stator 300. Cooling channel 400 is supplied, via an inlet and an outlet, with coolant, which circulates in cooling channel 400 for cooling the stator (the ring-shaped or cylindrical configuration of cooling channel 400 and the supply via inlet and outlet applies for all embodiments of the charging device described in the following). In addition, a split tube 700 is arranged between rotor 500 and stator 300. A first seal 810 is provided in the axial direction between stator housing 200 and a first end of stator 300 and a second seal 820 is provided in the axial direction between stator housing 200 and a first end of split tube 700. As is gathered from FIG. 1, the first end of the stator is the proximal end of stator 300 relative to compressor wheel 600, i.e. the end of stator 300 located closer to compressor wheel 600 than the proximal second end of stator 300. Likewise, it arises from FIG. 1 that the first end of split tube 700 is a distal end of split tube 700 relative to compressor wheel 600. The embodiment of charging device 10 shown in FIG. 1 additionally has a third seal 830 in the axial direction between stator housing 200 and a proximal second end of split tube 700, such that a dry compartment is created between first seal 810 and third seal 830. The dry compartment is used for the dry accommodation of an electrical connection of the stator to a control unit, which may be provided, for example, between a housing wall and a housing cover or between a housing wall and a compressor housing back wall.

Charging device 10 according to the invention has the advantage that stator 300 is directly flushed with cooling fluid and thus an efficient cooling of stator 300 is facilitated. In addition, stator housing 200 may be produced in a die casting method, as no cooling channels need to be provided in stator housing 200. This means that a smaller design of stator housing 200 may be realized, and a reduction of the material costs as well as a simpler and more cost-efficient production of charging device 10. Simultaneously, charging device 10 according to the invention facilitates a good cooling of the rotor on the basis of split tube 700. In one preferred embodiment, split tube 700 may be blackened in order to better be able to accommodate the heat of rotor 500 via radiation, by which means the indirect cooling of rotor 500 is more efficient.

In the embodiment of FIG. 1, cooling channel 400 extends radially inward in the area of the distal second end of stator 300 between stator 300 and stator housing 200 in the direction of shaft 100. The area of cooling channel 400 extending radially inward may thereby reach up to a bearing seat of a bearing of shaft 100, by which means the bearing seat is cooled. The bearing is also indirectly cooled in this way.

Stator housing 200 in FIG. 1 comprises a main body 210 and a cover 220. Second seal 820 is arranged between split tube 400 and cover 220 of stator housing 200. As is recognized from FIG. 1, cover 220 has a projection 225 and seal 820 is arranged between this projection 225 and split tube 700. The projection defines on its inner side a bearing seat for a bearing for mounting shaft 100. Due to this type of arrangement, the cooling channel may be configured up to the bearing seat and thus the coolant circulating there may also cool the bearing seat and additionally indirectly the bearing.

Stator 300 of the charging device according to the invention may, for example, comprise windings and sealing compound. First seal 810 may be integrated directly into the sealing compound or be formed from the sealing compound in a configuration of this type. In addition, in charging device 10 from FIG. 1 according to the invention, the walls of cooling channel 400 are formed directly from stator housing 200 and the sealing compound of stator 300. This may be facilitated by the use of a fluid-tight, in particular a water-tight sealing compound. In this type of configuration, third seal 830 may also be omitted, since a dry compartment may be formed radially with first seal 810 with an axial limitation by the fluid-tight sealing compound of stator 300. Alternatively or additionally, a fluid-tight membrane may be provided (not shown in FIG. 1), which surrounds stator 300. Then the walls of cooling channel 400 are formed by the membrane and stator housing 200.

Figure 2:
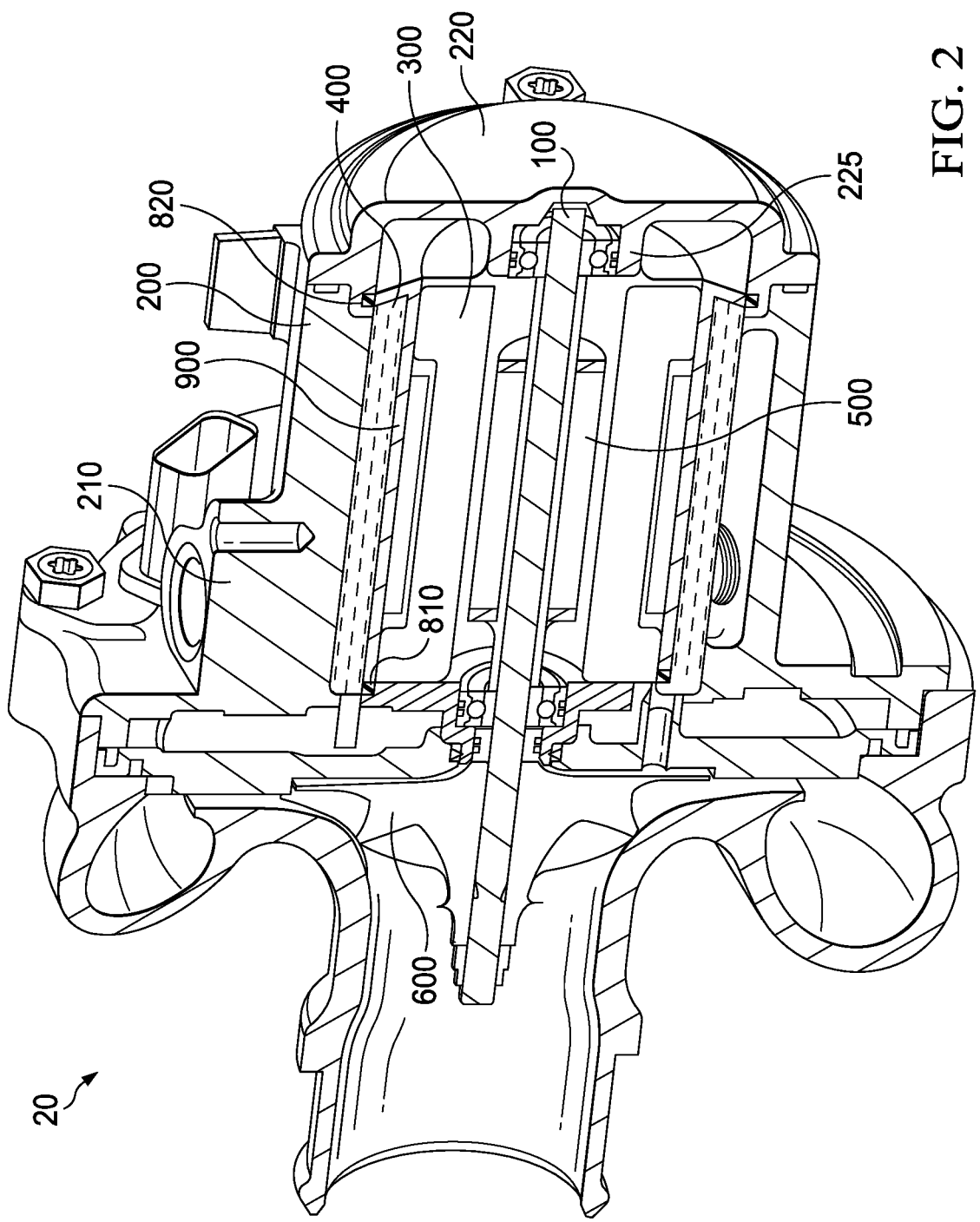
FIG. 2 shows a cutaway view of a second embodiment of the charging device according to the invention.

FIG. 2 shows a second embodiment of charging device 20 according to the invention. Charging device 20 has in turn a shaft 100, a compressor wheel 600 arranged on shaft 100, a stator housing 200, and a stator 300. Charging device 20 also comprises a rotor 500 arranged on shaft 100 and a cooling channel 400 extending axially for accommodating a coolant. In contrast to the embodiment of FIG. 1, charging device 20 of FIG. 2 does not have a split tube. A separation tube 900 is arranged for this purpose between stator 300 and stator housing 200 so that cooling channel 400 is formed in the radial direction between separation tube 900 and stator housing 200. In an alternative embodiment, separation tube 900 and additionally split tube 400 shown in FIG. 1 may be provided.

In charging device 20 of FIG. 2, it is advantageous that an efficient cooling of stator 300 is likewise facilitated, as the coolant is separated from stator 300 only by thin separation tube 900. In addition, stator housing 200 may be produced in a die casting method in this embodiment, as no cooling channels need to be provided in stator housing 200. Separation tube 900 itself may be manufactured in a simple way, for example, by deep drawing. In sum, this means in turn a smaller design of stator housing 200 and a reduction of the material costs as well as a simpler and more cost-efficient production of charging device 20 at a simultaneously efficient stator cooling.

FIG. 2 shows that a first seal 810 is provided between stator housing 200 and a first (proximal with respect to compressor wheel 600) end of separation tube 900, and a second seal 820 is provided between stator housing 200 and a (distal with respect to compressor wheel 600) end of separation tube 900. First seal 810 is arranged in turn in the area of the radially outer circumference of stator 300 so that a dry compartment is created radially inward of seal 810 in the area of the proximal end of stator 300.

In the embodiment of the charging device depicted in FIG. 2, the longitudinal section of separation tube 900 is L-shaped. Radially arranged leg 910 of separation tube 900 extends radially outward. Second seal 820 is arranged between the radial end of radially extending leg 910 and stator housing 200 (see FIG. 2). In FIG. 2, seal 820 is arranged between leg 910 and cover 220 of housing 200. Seal 820 may equally be arranged between leg 910 and main body 210 of housing 200 as well. In an alternative embodiment, the radially extending leg of separation tube 900 may extend radially inward. Second seal 820 may then be arranged between the radial end of the radially extending leg and stator housing 200 such that cooling channel 400 may extend radially inward between separation tube 900 and stator housing 200 in the direction of shaft 100. In particular, seal 820 may be arranged between the leg and projection 225 of stator housing 200 which defines a bearing seat for a bearing for mounting shaft 100. Stator housing 200, as shown in FIG. 2, comprises in turn main body 210 and cover 220. Projection 225 is a part of cover 220, so that second seal 820 may also be arranged between separation tube 900 and cover 220 in an alternative that is not shown.

Stator 300 may comprise windings and sealing compound. The windings of stator 300 may be arranged in separation tube 900 during production and may be cast therein so that a fixed connection is created between stator 300 and separation tube 900 after the die casting. Thus, process steps and the connection of the stator to the separation tube may be omitted and the combination made from the stator with separation tube may also be mounted as a module.

In particular, it may be advantageous to configure separation tube 900 as a deep drawn component and thus to manufacture it in an advantageous way.

A third embodiment of the charging device, which is not shown in the figures (reference numerals for correspondingly identical components will be retained in this case for better understanding), may likewise have a shaft 100, a compressor wheel 600 arranged on shaft 100, a stator housing 200, and a stator 300. The stator in turn has windings and sealing compound. In addition, the charging device comprises rotor 500 arranged on shaft 100 and an axially extending cooling channel 400 for accommodating a coolant between stator housing 200 and stator 300. A first seal 810 is provided in the axial direction between stator housing 200 and a first end (proximal with respect to compressor wheel 600) of stator 300, and a second seal is provided in the axial direction between stator housing 200 and a second end (distal with respect to compressor wheel 600) of stator 300. In contrast to the other embodiments, there is no separation tube and no split tube, and the seals are arranged on both sides directly between stator housing 200 and stator 300 so that the walls of cooling channel 400 are formed directly by stator housing 200 and the sealing compound of stator 300. This may in turn be facilitated, for example, by the use of a fluid-tight, in particular a water-tight sealing compound. Alternatively, a fluid-tight, in particular a water-tight membrane surrounds stator 300. Then the walls of cooling channel 400 are formed from the membrane and stator housing 200. Advantageously in this embodiment of the charging device as well, the stator is directly flushed by cooling fluid and thus an efficient cooling of the stator is facilitated. Likewise, the stator housing may be produced in a die casting method, as no cooling channels need to be provided in the stator housing. This means in turn that a smaller design of the stator housing may be realized, and that a reduction of the material costs as well as a simpler and more cost-efficient production of the charging device.

The first and/or the second seal may be directly integrated into the sealing compound or be formed from the sealing compound in this embodiment. The second end of stator 300 (the distal end of stator 300 when viewed from compressor wheel 600) and the second seal may be arranged in the area of the radially inner circumference of the second end of stator 300 such that cooling channel 400 extends radially inward between stator 300 and stator housing 200 in the direction of shaft 100. The area of cooling channel 400 extending radially inward may thereby extend up to a bearing seat of a bearing of shaft 100, by which means the bearing seat is cooled. The bearing is also indirectly cooled in this way.

First seal 810 may in turn be arranged in the area of the radially outer circumference of stator 300, so that a dry compartment is created radially within seal 810 in the area of the first end of stator 300 (proximal with respect to compressor wheel 600). Stator housing 200 may also comprise in this embodiment a main body 210 and a cover 220, so that second seal 820 may be arranged between stator 300 and cover 220, in particular between projection 225 of cover 220, which defines the bearing seat for the bearing for mounting shaft 100.

Although the present invention has been described and is defined in the attached claims, it should be understood that the invention may also be alternatively defined according to the following embodiments:

1. A charging device (10) for an internal combustion engine, comprising:
   a shaft (100);
   a compressor wheel (600) arranged on the shaft (100);
   a stator housing (200);
   a stator (300), wherein the stator (300) is arranged within the stator housing (200);
   a rotor (500) arranged on the shaft (100); and
   an axially extending cooling channel (400) for accommodating a coolant between the stator housing (200) and the stator (300);
   characterized in that a split tube (700) is provided between the rotor (500) and the stator (300),
   wherein a first seal (810) is provided in the axial direction between the stator housing (200) and a first end of the stator (300) and a second seal (820) is provided in the axial direction between the stator housing (200) and a first end of the split tube (700).

2. The charging device according to Embodiment 1, characterized in that a third seal (830) is provided in the axial direction between the stator housing (200) and a second end of the split tube (700), so that a dry compartment is created between the first seal (810) and the third seal (830).

3. The charging device according to Embodiment 1 or Embodiment 2, characterized in that a second end of the stator (300), which is the distal end of the stator (300) when viewed from the compressor wheel (600) and is opposite the first end of the stator (300), and the cooling channel (400) extends radially inward in the area of the second end of the stator (300) between the stator (300) and the stator housing (200) in the direction of the shaft (100).

4. The charging device according to any one of the preceding embodiments, characterized in that the stator (300) comprises windings and sealing compound, wherein optionally the first seal (810) is integrated directly into the sealing compound or is formed from the sealing compound.

5. The charging device according to Embodiment 4, characterized in that the walls of the cooling channel (400) are formed directly by the stator housing (200) and the sealing compound of the stator (300), or in that a fluid-tight, in particular a water-tight membrane surrounds the stator (300) and the walls of the cooling channel (400) are formed from the membrane and stator housing (200).

6. The charging device according to any one of the preceding embodiments, characterized in that the stator housing (200) comprises a main body (210) and a cover (220), in particular wherein the second seal (820) is arranged between the split tube (400) and the cover (220), in particular a projection (225) of the cover (220) which defines a bearing seat for a bearing for mounting the shaft (100).

7. A charging device (20) for an internal combustion engine, comprising:
   a shaft (100);
   a compressor wheel (600) arranged on the shaft (100);
   a stator housing (200);
   a stator (300), wherein the stator (300) is arranged within the stator housing (200);
   a rotor (500) arranged on the shaft (100); and
   an axially extending cooling channel (400) for accommodating a coolant;
   characterized in that a separation tube (900) is arranged between the stator (300) and the stator housing (200) so that the cooling channel (400) is formed in the radial direction between the separation tube (900) and the stator housing (200).

8. The charging device according to Embodiment 7, characterized in that a first seal (810) is provided between the stator housing (200) and a first end of the separation tube (900) and a second seal (820) is provided between the stator housing (200) and a second end of the separation tube (900).
9. The charging device according to Embodiment 8, characterized in that the first seal (810) is arranged in the area of the proximal end of the stator (300), when viewed from the compressor wheel (600), and in the area of the radially outer circumference of the stator (300) such that a dry compartment is created radially within the seal (810) in the area of the proximal end of the stator (300).
10. The charging device according to any one of Embodiments 6 through 9, characterized in that the longitudinal section of the separation tube (900) is L-shaped.
11. The charging device according to Embodiment 10, characterized in that a radially arranged leg (910) of the separation tube (900) extends radially outward, and the second seal (820) is arranged between the radial end of the radially extending leg (910) and the stator housing (200).
12. The charging device according to Embodiment 10, characterized in that a radially arranged leg (910) of the separation tube (900) extends radially inward, and the second seal (820) is arranged between the radial end of the radially extending leg and the stator housing (200), in particular a projection of the stator housing (200), which defines a bearing seat for a bearing for mounting the shaft (100).
13. The charging device according to Embodiment 12, characterized in that the stator housing (200) comprises a main body (210) and a cover (220), in particular wherein the projection (225) is a part of the cover (220) and the second seal (820) is arranged between the separation tube (900) and the cover (220).
14. The charging device according to any one of Embodiments 6 through 13, characterized in that the stator (300) comprises windings and a sealing compound, and in that the windings of the stator (300) are arranged in the separation tube (900) during manufacture and are cast therein such that a fixed connection is created between the stator (300) and the separation tube (900).
15. The charging device according to any one of Embodiments 6 through 14, characterized in that the separation tube (900) is a deep drawn part.
16. A charging device for an internal combustion engine, comprising:
    a shaft;
    a compressor wheel arranged on the shaft;
    a stator housing;
    a stator, wherein the stator is arranged within the stator housing, and wherein the stator comprises windings and sealing compound;
    a rotor arranged on the shaft; and
    an axially extending cooling channel for accommodating a coolant between the stator housing and the stator;
    characterized in that a first seal is provided in the axial direction between the stator housing and a first end of the stator and a second seal is provided in the axial direction between the stator housing and a first end of the stator, and
    in that the walls of the cooling channel are formed directly by the stator housing and the sealing compound of the stator, or
    in that a fluid-tight, in particular a water-tight membrane surrounds the stator and the walls of the cooling channel are formed from the membrane and stator housing.
17. The charging device according to Embodiment 16, characterized in that the first and/or the second seal is directly integrated into the sealing compound or is formed from the sealing compound.
18. The charging device according to Embodiment 16 or Embodiment 17, characterized in that the second end of the stator is the distal end of the stator, when viewed from the compressor wheel, and the second seal is arranged in the area of the radially inner circumference of the second end of the stator such that the cooling channel extends radially inward between the stator and stator housing in the direction of the shaft.
19. The charging device according to any one of Embodiments 16 through 18, characterized in that the first seal is arranged in the area of the radially outer circumference of the stator such that a dry compartment is created radially within the seal in the area of the first end of the stator.
20. The charging device according to any one of Embodiments 16 through 19, characterized in that the stator housing comprises a main body and a cover, in particular wherein the second seal is arranged between the stator and the cover, in particular a projection of the cover, which defines a bearing seat for a bearing for mounting the shaft.

The invention claimed is:
1. A charging device (10) for an internal combustion engine, comprising:
    a shaft (100);
    a compressor wheel (600) arranged on the shaft (100);
    a stator housing (200);
    a stator (300), wherein the stator (300) is arranged within the stator housing (200);
    a rotor (500) arranged on the shaft (100); and
    an axially extending cooling channel (400) for accommodating a coolant between the stator housing (200) and the stator (300);
    wherein a split tube (700) is provided between the rotor (500) and the stator (300), and
    wherein a first seal (810) is provided in the axial direction between the stator housing (200) and a first end of the stator (300) and a second seal (820) is provided in the axial direction between the stator housing (200) and a first end of the split tube (700).
2. The charging device according to claim 1, wherein a third seal (830) is provided in the axial direction between the stator housing (200) and a second end of split tube (700) such that a dry compartment is created between the first seal (810) and the third seal (830).
3. The charging device according to claim 1, wherein a second end of the stator (300), which is the distal end of the stator (300) when viewed from the compressor wheel (600), is opposite the first end of the stator (300), and the cooling channel (400) extends radially inward in the area of the second end of the stator (300) between the stator (300) and the stator housing (200) in the direction of the shaft (100).
4. The charging device according to claim 1, wherein the stator (300) comprises windings and sealing compound.
5. The charging device according to claim 4,
    wherein the walls of the cooling channel (400) are formed directly by the stator housing (200) and the sealing compound of the stator (300), or
    wherein a fluid-tight membrane surrounds the stator (300) and the walls of the cooling channel (400) are formed from the membrane and stator housing (200).
6. The charging device according to claim 1, wherein the stator housing (200) comprises a main body (210) and a cover (220).

7. The charging device according to claim 1, wherein the stator (300) comprises windings and sealing compound, and wherein the first seal (810) is directly integrated into the sealing compound or is formed from the sealing compound.

8. The charging device according to claim 1, wherein the stator housing (200) comprises a main body (210) and a cover (220), and wherein the second seal (820) is arranged between the split tube (700) and a projection (225) of the cover (220) which defines a bearing seat for a bearing for mounting the shaft (100).

* * * * *